Figure 1:
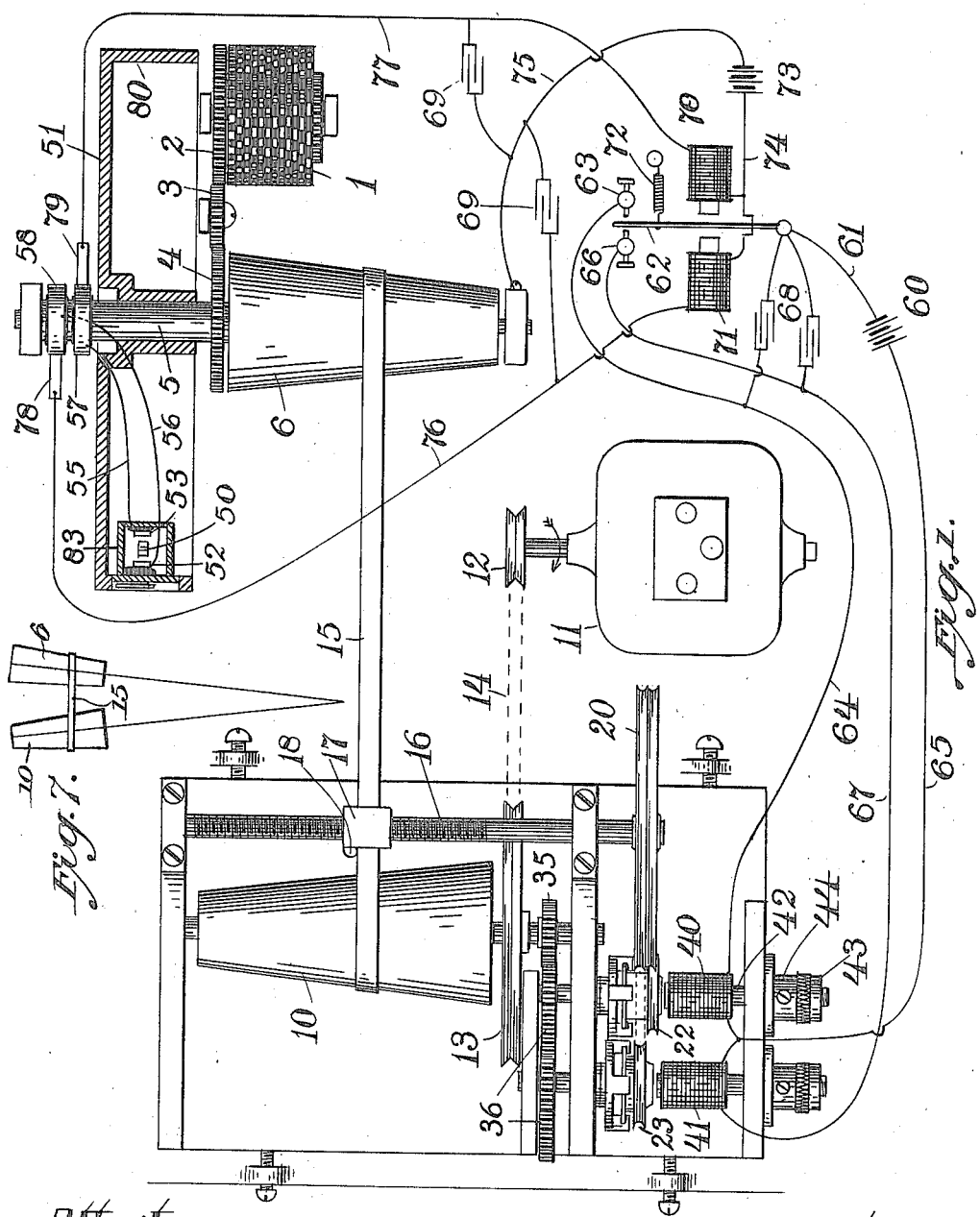

M. L. SEVERY & G. B. SINCLAIR.
ELECTRIC GOVERNOR.
APPLICATION FILED JULY 22, 1907.

1,161,349.

Patented Nov. 23, 1915.
4 SHEETS—SHEET 1.

Attest;
M. W. Macy.
N. P. Rich.

Inventors,
Melvin L. Severy,
George B. Sinclair;
By A. B. Upham,
Attorney.

M. L. SEVERY & G. B. SINCLAIR.
ELECTRIC GOVERNOR.
APPLICATION FILED JULY 22, 1907.
1,161,349.
Patented Nov. 23, 1915.
4 SHEETS—SHEET 2.
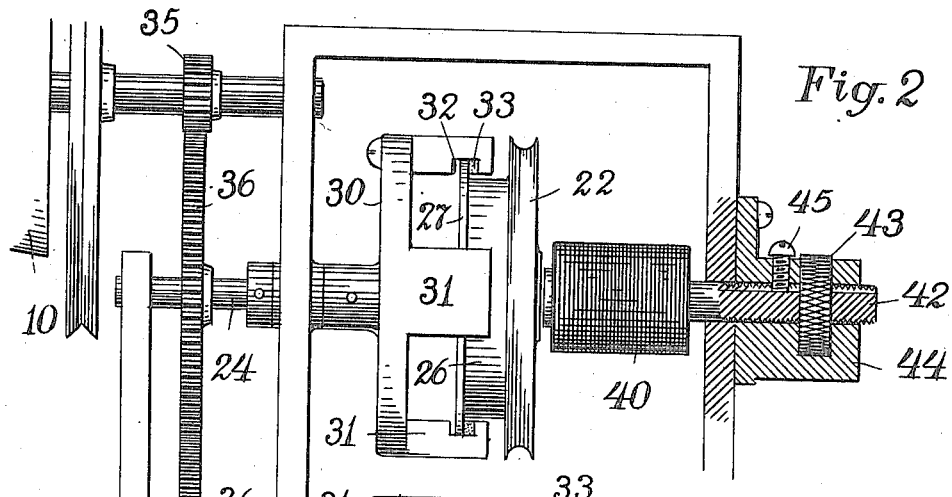
Fig. 2
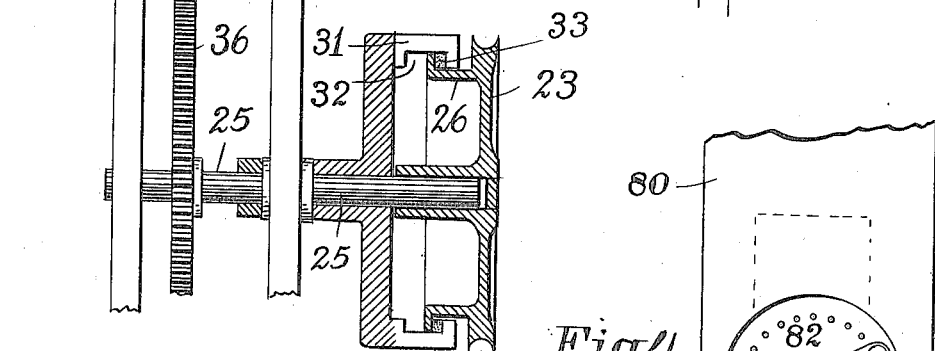
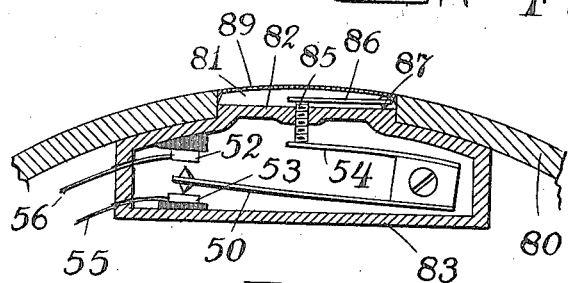
Fig. 3
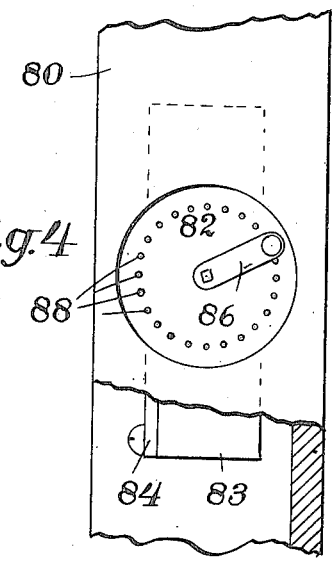
Fig. 4
Attest;
M. W. Macy.
W. P. Rich.
Inventors,
Melvin L. Severy,
George B. Sinclair;
By A. B. Upham,
Attorney.

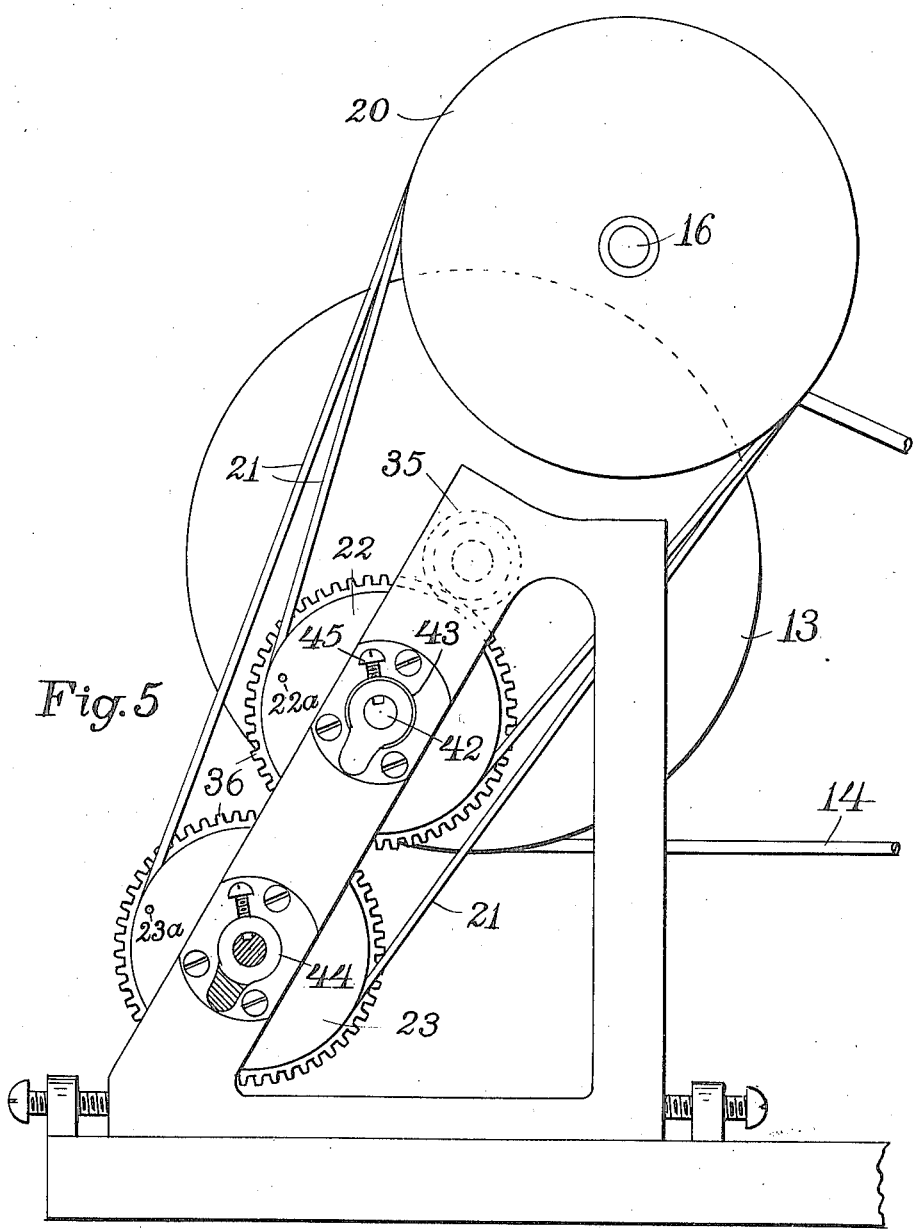

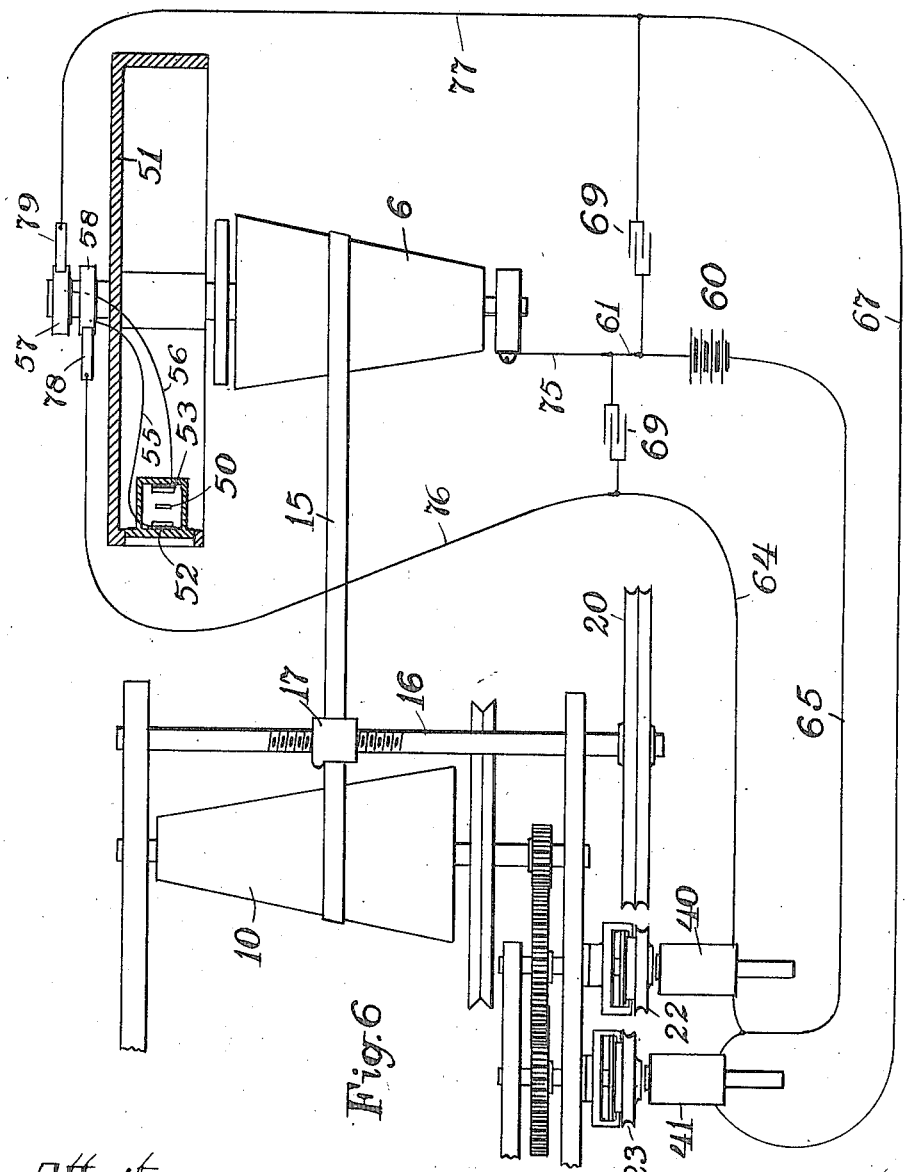

UNITED STATES PATENT OFFICE.

MELVIN L. SEVERY, OF ARLINGTON HEIGHTS, AND GEORGE B. SINCLAIR, OF BOSTON, MASSACHUSETTS, ASSIGNORS TO CHORALCELO COMPANY, OF BOSTON, MASSACHUSETTS, A CORPORATION OF MAINE.

ELECTRIC GOVERNOR.

1,161,349.  Specification of Letters Patent.  Patented Nov. 23, 1915.

Application filed July 22, 1907. Serial No. 384,872.

*To all whom it may concern:*

Be it known that we, MELVIN L. SEVERY, of Arlington Heights, in the county of Middlesex and Commonwealth of Massachusetts, and GEORGE B. SINCLAIR, of Boston, in the county of Suffolk and said Commonwealth, both citizens of the United States, have invented certain new and useful Improvements in Electric Governors, of which the following is a specification.

While this governor is adapted for the accurate control of any ordinary type of driven mechanism, it is especially designed and adapted for synchronizing the rotation of the toothed make-and-break members employed in our musical instruments wherein tuned sonorous bodies are vibrated through the agency of properly timed electric pulsations delivered to electromagnets; for which purpose the speed of said members must be controlled with practically absolute uniformity.

In general construction, this governor is very similar to the governor set forth in our companion application Serial No. 754,475, but it differs therefrom in many important details, among them being our present employment of a relay, of condensers, means for adjusting the clutch-operating magnets, the employment of electromagnets for both the retardative and the accelerative devices, the construction of an improved clutch mechanism, the production of a two-point contact finger, and of improved means for housing and adjusting such finger.

Referring to the drawings forming a part of this specification, Figure 1 is a plan view of a governor made in accordance with our invention. Fig. 2 is an elevation, more or less in section, illustrating in full size the clutch mechanism. Fig. 3 is a sectional view of a portion of the rim of the governor wheel showing the contact finger and its housing and adjusting devices. Fig. 4 is a peripheral view of the same. Fig. 5 is an end elevation of the part of the mechanism comprising the driving cone and the variable speed devices. Fig. 6 is a diagram showing our two-point contact governing finger controlling the variable speed devices without the intervention of the relay. Fig. 7 is a diagrammatic view showing the driving and driven cones with their axes inclined one relatively to the other, the inclination being exaggerated for the sake of clearness.

The reference numeral 1 designates certain of the toothed make-and-break members whose rotation it is desired to control, and which are rotated through the agency of the gears 2, 3 and 4; the gear 3 being an idler while the gear 4 is fixed upon the shaft 5 supporting the driven cone 6. Upon this shaft is located the governor disk, or wheel, carrying the contact finger which will be described hereinafter.

The driving cone 10, which is suitably rotated by any convenient means, as the electric motor 11 connected thereto by pulleys 12, 13 and belt 14, is made to communicate power to the driven cone by an endless belt 15. To shift said belt and thereby vary the speed communicated to the driven cone inversely to the variations on the part of the driving cone, the shifter screw 16 has a nut 17 thereon from which depends an arm 18 into contact with one edge of the belt; the said belt being made to tend against such arm in any suitable way, as that of a slight non-parallelism of the two cones, set forth in our said companion application, and illustrated in Fig. 7 hereof. On said screw is fixed a two-grooved pulley 20, from each of which grooves passes an endless belt 21 to the two loose pulleys 22, 23 on the shafts 24, 25 respectively. As shown in Fig. 5, the axes of said pulleys are located in the same oblique plane with the screw 16, which fact, taken in conjunction with the lateral displacement of the pulleys, prevents said belts from interference with each other.

Projecting from the side of each pulley, 22, 23 is an annulus 26 from the edge of which rises a flange 27, as shown in Fig. 2, all composing one member of the friction clutch provided for each pulley. The other member of each clutch consists of the disk 30 fixed upon its shaft 24 or 25, and provided with a plurality of arms 31 projecting axially therefrom, the number of which is preferably three. In the inner face of each arm 31 is a groove 32 having a strip of friction material 33 secured therein at the side toward the loose pulley, and within these grooves runs said flange 27. By drawing a loose pulley away from its clutch member 30, which is adapted to be constantly running, sufficient friction is generated between the flange 27 and the material 33 to rotate such loose pulley with said clutch member or disk 30. The means for keeping the two disks 30 in motion consists of the spur gear 35 fixed on the shaft of the driving cone 10, and the two equal gears 36 meshing with each other, and the upper of the two meshing with said pinion. This intermeshing of the two gears causes both them and the clutch members 30 to rotate not only equally but in opposite directions. Hence, when the loose pulley 22 is turned, the double pulley 20 and hence the screw 16 are rotated in one direction; while the release of the just-named pulley and the turning of the loose pulley 23 rotate the double pulley and the screw in the opposite direction. This gives the desired two directions of travel to the nut 17 and the belt shifter connected therewith. To alternately actuate the said clutches, an electromagnet is provided for each,—the electromagnet 40 for the loose pulley 22, and the electromagnet 41 for the loose pulley 23. Each electromagnet is supported by means of a threaded stem 42 slidable within a fixed thimble 44 held by the framework, and longitudinally adjusted by means of a milled nut 43 located in a suitable slot in said thimble. A set screw 45 abutting within a longitudinal groove in said stem, or a spline, keeps the stem and magnet from turning, and also serves to fix the magnet at any point of adjustment. See Fig. 2. These electromagnets are appropriately energized by means of current switched to one or the other through a centrifugally operated contact finger 50 carried by the governor disk or wheel 51. Instead of employing the same current for energizing said magnets as that which traverses said contact finger, a relay circuit is used for the said magnets preferably controlled by a weaker circuit provided for said finger.

The relay circuit comprises the source of electricity 60, wire 61, tongue 62, the contact 63 (if said tongue is in touch therewith) wire 64, magnet 40, and wire 65 back to said source. Should said tongue be in engagement with the contact 66, then the current will traverse the wire 67 and the electromagnet 41. This relay operates equally well with a single switching magnet 71 and an opposing tension spring 72, or the two opposing magnets 70, 71 shown in Fig. 1. For the latter, the centrifugal finger 50 must co-operate with two contacts wired to the two magnets, while for the former, a single contact is sufficient.

For the two-contact arrangement, the circuit will traverse, when the governor disk drops below normal speed, the battery or other current-source 73, wire 75, the framework and cone shaft 5 through the disk or wheel 51 to the finger 50, thence through the contact 53 against which said finger is pressing, wire 55, insulated ring 57, brush 79, wire 77, magnet windings 70 and wire 74 back to the source, thus energizing the magnet 70 and putting the relay current into control of the electromagnet 40. The motor 11 rotating in the direction shown by the arrow, the direction of turn thus given to the screw 16 will advance the belt 15 to a larger section of the driving cone 10, while also bringing said belt to a smaller section of the driven cone 6, and will accordingly immediately increase the speed of the latter. Notwithstanding the almost inconceivably sensitive action of the spring contact-finger, it cannot reverse the belt-shifting devices upon the exact instant when the latter have brought the driven mechanism to the predetermined speed, for the inertia of the parts will cause the belt-shifter to move the belt the slightest possible distance too far. For the instant the predetermined speed is passed, the sensitive contact-finger causes current to be delivered for the reversal of the belt-shifter, but as the latter cannot begin its work for the infinitesimal fraction of a second, the result is that the driven mechanism is never for an appreciable length of time exactly at the predetermined speed, but is constantly swinging up and down past it through a range so exceedingly limited that for all practical purposes, in its application to the control of the pulsating devices, its speed is constant. This increase in speed, the finger 50 being suitably adjusted, will bring said finger into touch with the contact 52 and thereby demagnetize the electromagnet 70 and energize the electromagnet 71; thus throwing the tongue 62 into touch with the contact 66 and causing the clutch magnet 41 to be energized. The screw 16 being by this means rotated oppositely, the belt will be shifted to a smaller section of the driving cone 10, and the speed of the driven cone reduced. The circuit thus closed by the finger 50 comprises the source 73, wire 75, frame and other parts to the finger as before, thence through the contact 52, wire 56, insulated ring 58, brush 78, wire 76, electromagnet 71 and wire 74 back to said source.

By the employment of a relay for the operation of the clutches as above described, a strong current can be supplied to the electromagnets 40, 41 in order to suitably energize them, and a comparatively weak current used in the circuit through the contact finger. Such weak current permits the said finger and its contacts to be very close together without danger of sparking or a jump-discharge; and this closeness gives a remarkable sensitiveness to the governing device; the slightest conceivable variation in speed being enough to actuate the belt-shifting devices. To still further insure against sparking, condensers 68 are put in a shunt circuit between the tongue 62 and the wires 64 and 65, and also condensers 69 are shunted between the wires 75 and 76, and 75 and 77. This prevents harmful sparking both between the tongue 62 and its contacts 63, 66, and between the finger 50 and its contacts 52, 53.

We prefer to provide the governor disk or wheel 51 with a comparatively heavy peripheral flange 80 to aid in steadiness of motion; and in this flange is formed a circular opening 81 within which is inserted the circular section 82 of the housing box 83 for the finger 50, as shown in Figs. 3 and 4. Centrally through said section or face 82 is tapped the adjusting screw 85 abutting against an arm 54 connected with said finger. Fixed to the exterior end of said screw is a resilient arm or handle 86 having a terminal point 87 adapted to resiliently engage with the small indentations 88 drilled or otherwise formed in said face; and thereby to be held at any angle of adjustment.

A cover 84 suitably secured to the open side of said box, as indicated in Fig. 4, guards against all possibilty of the accumulation of dust upon the contacts or the finger; and so insures the continued accuracy of the governor's operation. We also prefer to fit a cover 89 to the opening 81 inclosing the same against the admission of dust and moisture, and also insuring against the possibility of any object coming in contact with the edges of said opening, or against the adjusting handle 86 and knocking the latter out of position.

As illustrated in Fig. 6, the two-point contact finger 50 may be used without the relay above described. Here, the wire 76 is joined direct to the wire 64, the wire 77 to the wire 67, and the wire 75 to the wire 61. Now when the wheel or disk 51 slows down, the finger 50 meets the contact 53; and the current flows from the source 60 through the wires 61, 75 to the frame, cone, disk and finger 50; thence through the contact 53, wire 56, insulated ring 57, brush 79, wires 77, 67 to the electromagnet 41, and then back through the wire 65 to said source. Thus wired and with the cone 10 turning in the same direction as described in the construction set forth in Fig. 1, the screw 16 should be left handed in order to shift the belt 15 to a larger diameter of the cone. With the motion of the cone 6 and the governor disk or wheel 51 thus accelerated, the finger 50 is thrown into engagement with the contact 52, and instantly the current passes to the electromagnet 40; the circuit comprising the source 60, wires 61, 75, frame, cone, disk and finger to said contact; thence along the wire 55 to the insulated ring 58, brush 78, wires 76, 64 to said magnet 40, and then back through the wire 65 to said source. Condensers 69 are introduced into a shunt between the wires 77 and 75, and also between the wires 75 and 76 for diminishing the sparking between the finger and its contacts.

The arrangement above described whereby the electromagnets 40, 41 can be adjusted relative to their respective clutch members, is a most important one; and the way in which we do it is as follows: The machine being set in motion in the usual way, current is delivered to both electromagnets 40, 41 simultaneously, as by means of a suitable conductor put into touch with the three wires 61, 64 and 67. Inasmuch as the clutch members are now turned in opposite directions at the same time, one or the other of the two belts 21 joining the pulleys 22, 23 with the double pulley 20 must slip. One or both the milled nuts 43 are then turned to put the electromagnets to such relative distances from the clutch members 22 and 23 that there will be an equal slippage and the pulley 20 will remain entirely motionless. This means that if one belt 21 is slightly looser than the other, its associated magnet must be nearer its pulley-armature in order that there shall be less slippage in the clutch thereof; while the tighter belt 21 must have its associated magnet slightly withdrawn in order to lessen its pull upon the clutch member and permit a sufficient slippage in the latter to equal the slippage of its neighbor's belt. Inasmuch as it is impossible to maintain an equality of tightness in the two belts 21, it is evident that this means of compensating therefor by means of the two electromagnets 40, 41 and the method just described, is of the highest importance to produce a perfectly operating governor. There are, of course, other factors entering into the case, as the slippage of the clutches, and inequality in the electromagnets' strength, but by adjusting the positions of the latter until the pulley 20 is wholly stationary, all the factors are perfectly corrected.

Another method of adjusting the electromagnets controlling the clutches, consists in linking the two pulleys 22, 23 together, and then shifting said electromagnets until neither of said pulleys can overbalance the other. For this purpose said pulleys are provided with small pins 22$^a$, 23$^a$ projecting therefrom, either from or close to their peripheries, and the ends of a small cord are tied to each. As these pulleys revolve in opposite directions, such cord holds them together. Of course, during this operation, the belts 21 are slipped off, in order not to interfere with the same.

What we claim as our invention and desire to secure by Letters Patent is as follows, to wit:

1. The combination with a driving means, of a device to be driven thereby at uniform speed; a speed-controlled electric switch carried by said driven device; electric circuits for said switch adapted to be closed one at a time thereby, and each containing an electromagnet; and means operable by said electromagnets for increasing or decreasing the speed of the driven device according as one or the other of said electromagnets is energized.

2. The combination with a driving means, of a rotatable device to be driven thereby at uniform speed; variable speed-transmitting means connecting the driving means and the driven device; a centrifugal electric switch carried by said driven device; electric circuits for said switch, adapted to be closed one at a time thereby and each containing an electromagnet; and means operable by said electromagnets and controlling the variable speed-transmitting means in accordance with energization of one or the other of said electromagnets.

3. In combination with a driving means and a device to be driven thereby at uniform speed; means for accelerating or retarding the speed of the driven device if the same fall below or rise above a predetermined normal, said means comprising electric circuits, electromagnets one in either of said circuits, a centrifugal switch carried by the driven device and adapted to close one or the other circuit as the speed rises above or falls below the predetermined normal, and clutches or connections controlled and operated by the respective magnets, and serving to bring into play the accelerative or the retardative means as one or the other of said magnets is energized.

4. In combination with a driving means and a device to be driven thereby at uniform speed; means for maintaining such uniform speed, the same comprising two reversely-turning wheels and a belt-shifter operatively connected with said wheels, two electromagnets associated respectively with said wheels and each serving when energized to cause the wheel with which it is associated to impart motion to the belt-shifter, circuits for said electromagnets, and a centrifugal circuit-closer carried by the device to be driven at uniform speed and serving upon minute variations of speed in said device above or below a predetermined normal, to close one or the other of said circuits and thereby to render operative one or the other of said electromagnets.

5. The combination with a driving means and a device to be driven thereby at uniform speed, of power-transmitting connections between the driving and the driven device; means acting upon the transmitting mechanism to accelerate the speed of the driven device; means acting upon the transmitting mechanism to retard the speed of the driven device; electromagnets associated respectively with the accelerating and with the retarding means; circuits for said magnets including a source of electric energy; and an electric switch carried by the driven device and adapted by reason of variation of its speed above or below a predetermined normal, to close one or the other of said magnet circuits, and thereby to bring into action the accelerative or the retardative means.

6. In combination with a driving means and a device to be driven thereby at uniform speed; variable-speed transmitting means connecting the driving and driven devices, and serving to vary their speed ratios, the same comprising oppositely-acting means for accelerating or for retarding the speed of the driven device as related to that of the driving device, electromagnets respectively associated with the accelerating and with the retarding means and serving to vary the relative driving moments thereof, one of said magnets being made adjustable to initially determine the normal relative driving moments of said accelerating and retarding devices, electric circuits for said magnets, and a circuit-closer carried by the driven device, common to both circuits, and adapted upon a variation of the speed of said driven device above or below a predetermined normal, to close one or the other of said circuits and energize one or the other of said magnets, and thus to place the variable speed mechanism under the control of the retardative or of the accelerative device as the speed rises or falls above or below the predetermined normal.

7. In combination with a driving means and a device to be driven thereby; variable-speed transmitting means connecting the driving and the driven devices; means for retarding the speed of the driven device; means for accelerating the speed of the driven device; electromagnets respectively controlling the accelerating and the retarding means; circuits for said electromagnets; and a light spring contact-finger normally tending to close the circuit of the magnet associated with the accelerative means, but adapted upon increase of the speed of the driven device to close the circuit of the magnet associated with the retardative means.

8. The combination of a driving device and a driven device, each circular in cross-section and one thereof conical, a belt connecting the same, a belt-shifter contacting with said belt at one edge only, and means for operating said belt-shifter, the driving and driven devices having their axes disposed at a slight angle with respect to each other for causing said belt to press against said shifter.

9. The combination of a driving cone, a driven cone, a belt connecting said cones, a belt-shifter contacting with said belt at one edge only, and means for operating said belt-shifter, said cones having their axes disposed at a slight angle one relative to the other for causing said belt to press against said shifter.

10. In combination with a driving cone, a driven cone, and a device to be driven at uniform speed carried by the shaft of said driven cone; a belt connecting said driving and driven cones; a shifter for said belt; a source of power; connecting devices between said belt-shifter and said source of power, for moving said shifter in opposite directions; friction clutches for throwing said devices independently into connection with said source of power; electromagnets for operating said clutches; a source of electric energy; circuits common to said source of energy and said electromagnets; and a circuit-closing device revolving with the driven cone and with the device whose speed is to be maintained constant, and controlling the circuits of said magnets.

11. In combination with a driving member and a member to be driven thereby; a driving belt adapted through lateral adjustment to vary the speed of the driven member; a shifter for said belt; a screw shaft for moving said shifter in one and the other direction; two wheels connected with the driving member and rotated thereby in reverse directions; two pulleys respectively associated with and adapted to receive motion from said reversely-turning wheels; a double pulley carried by the screw shaft; belts connecting the two pulleys with the double pulley; two electromagnets respectively associated with the two pulleys, and serving when energized to frictionally connect said pulleys with the wheels with which they are associated; and a switch carried by the driven member, and serving as the speed rises above or falls below a predetermined normal, to complete the circuit of one or the other of said electromagnets, and thereby to cause the pulley under its control to be connected with the wheel with which it is associated, by a friction in excess of the frictional connection of the companion pulley with its wheel, and thus to place the screw shaft under control of the pulley having such greater friction.

12. In combination with a rotating driving member, a rotatable device to be driven thereby, and a variable power-transmitting means connecting the same; an electrically-operated device controlling said power-transmitting means, and serving through it to accelerate or retard the speed of the driven device; an electric relay in circuit with said electrically-operated device; and a centrifugally-operable contact finger carried by and revolving with said driven device, for closing the relay circuit.

13. In combination with a rotary driving member and a device to be rotated thereby, a belt connecting the driving and driven members and serving when laterally shifted to vary their speed relation; a shifter for said belt; a screw shaft for moving said shifter; a double pulley carried by said screw shaft; two wheels connected with and driven in reverse directions by the driving member; normally loose driving pulleys respectively associated with said reversely-turning wheels, and adapted to be clutched therewith through electromagnetic action; electromagnets, one for each of said loose pulleys, and serving when energized to clutch said pulleys in driving engagement with their respective wheels; belts passing about the respective pulleys and about the double pulley of the screw shaft; and a circuit-closer carried by the driven member, tending normally to close the circuit of one of said electromagnets, and upon increase of speed in the driving member beyond a predetermined point, to break the circuit of such magnet and complete the circuit of the second magnet.

14. In combination with driving means and a device to be driven thereby, variable-speed mechanism connecting the same and including a screw shaft for controlling said mechanism; two continuously and reversely rotating wheels connected with and serving to turn said screw shaft in one and the other direction; pulleys interposed between the screw shaft and said wheels, and adapted to be clutched to the latter through the action of electromagnets; driving connections between said pulleys and the screw shaft; and a pair of electromagnets respectively associated with said pulleys, and serving when energized to cause frictional engagement thereof with their respective wheels, said electromagnets being independently adjustable toward and from their respective pulleys; whereby the effective clutching power of each may be initially determined and may at any time be regulated with reference to that of the companion magnet.

In testimony that we claim the foregoing invention, we have hereunto set our hands this 17th day of July, 1907.

MELVIN L. SEVERY.
GEORGE B. SINCLAIR.

Witnesses:
A. B. UPHAM,
CHAS. A. CHASE.